Dec. 6, 1955 M. R. DEWHURST 2,725,800
OPTICAL SYSTEMS
Filed Feb. 12, 1952 4 Sheets-Sheet 1
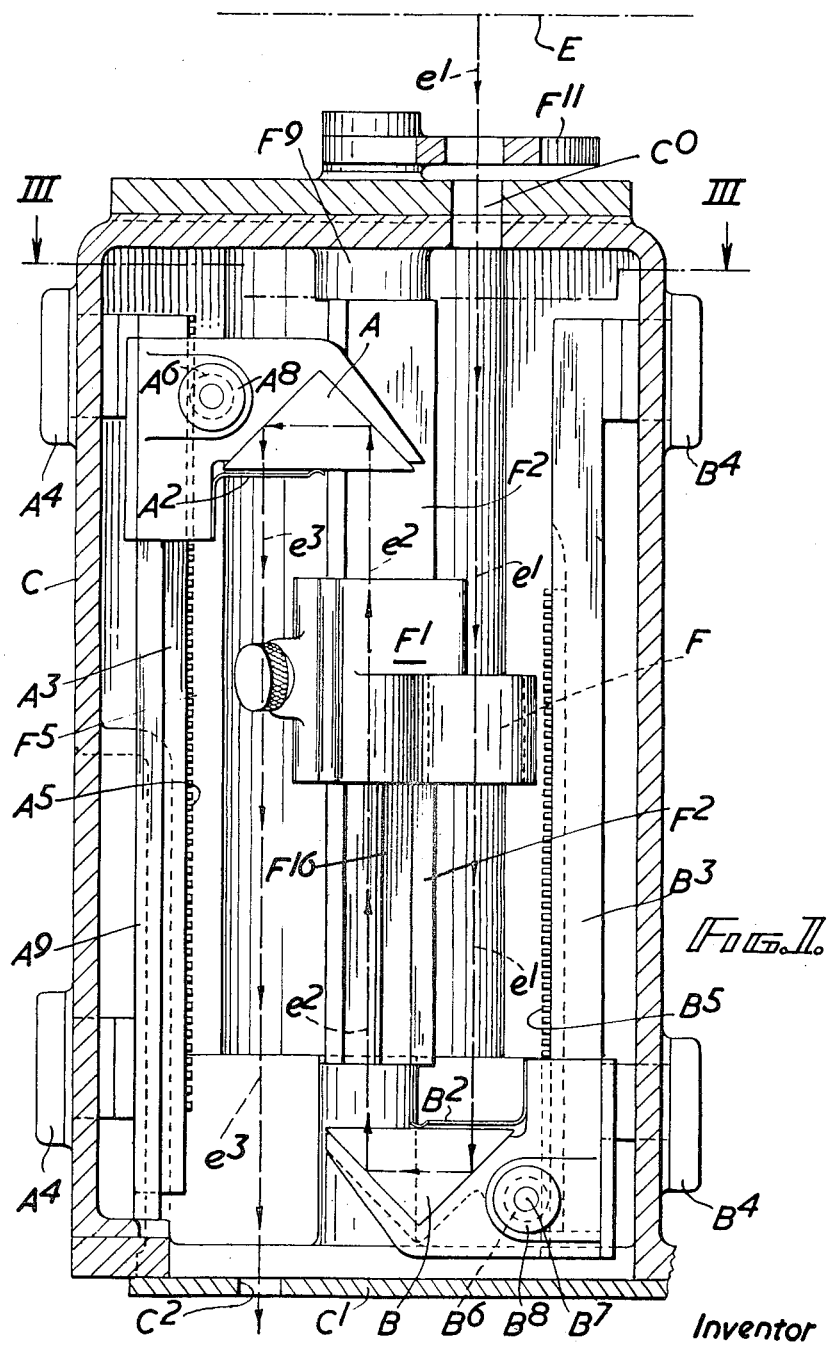
FIG. I.
Inventor
MAURICE RICHARD DEWHURST
By Morgan, Finnegan
Durham & Pine
Attorney

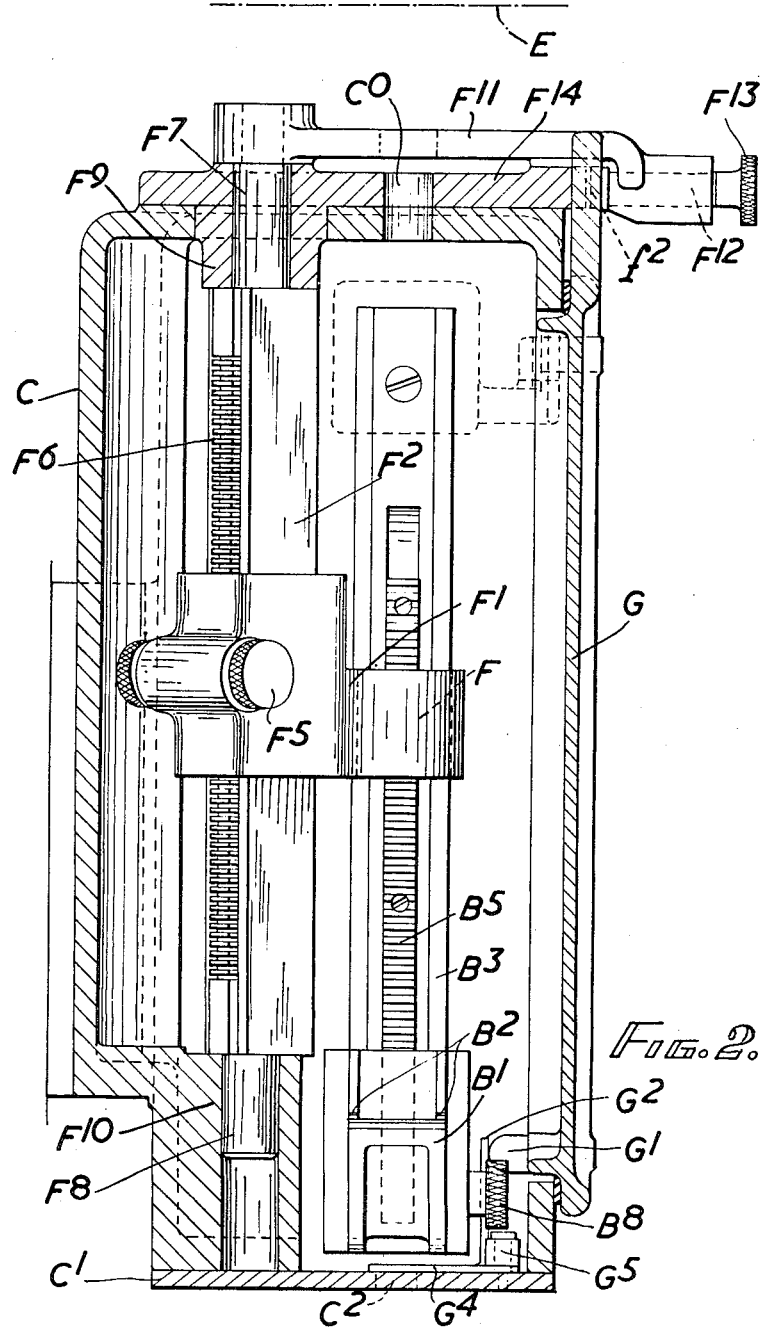

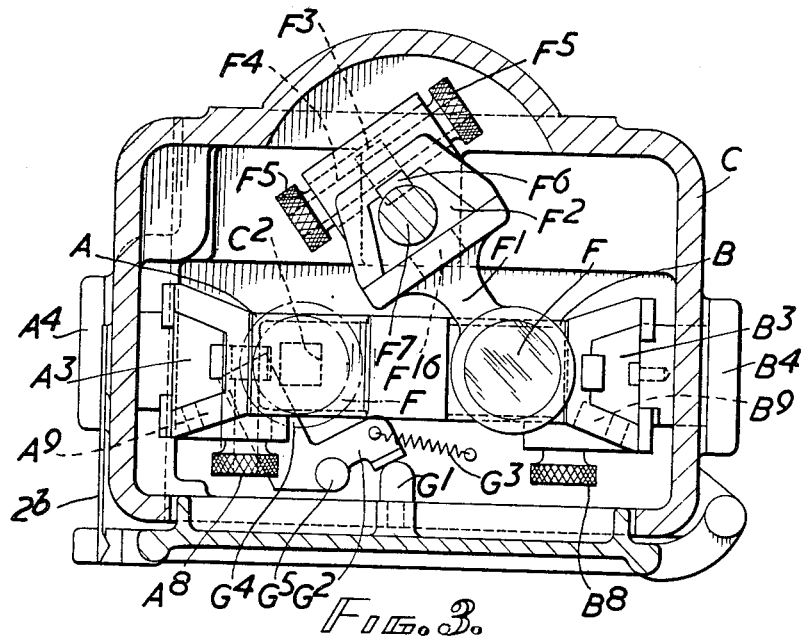
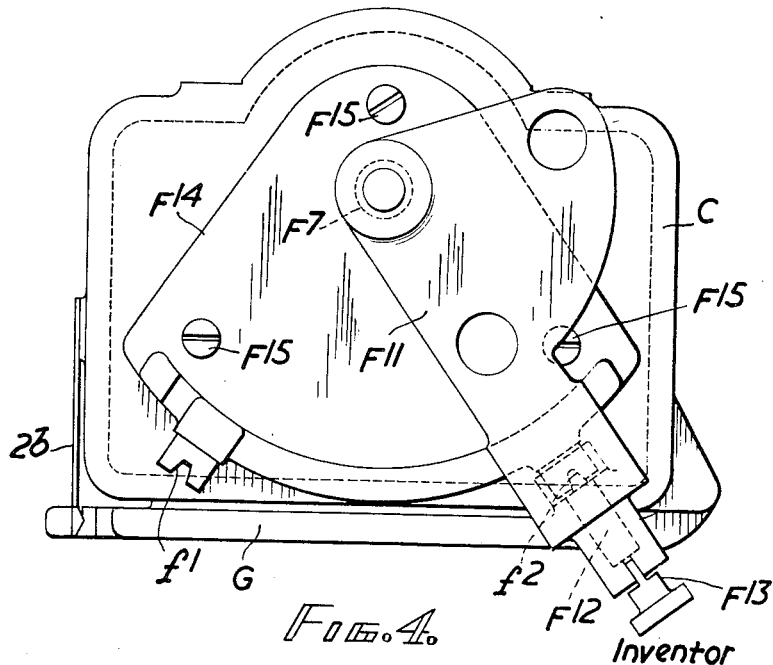

Dec. 6, 1955   M. R. DEWHURST   2,725,800
OPTICAL SYSTEMS

Filed Feb. 12, 1952   4 Sheets-Sheet 4

Inventor
MAURICE RICHARD DEWHURST

By Morgan, Finnegan, Durham & Pine
Attorney

United States Patent Office 2,725,800
Patented Dec. 6, 1955

2,725,800
OPTICAL SYSTEMS

Maurice Richard Dewhurst, Coulsdon, England, assignor to The Monotype Corporation Limited, London, England, a corporation of Great Britain Application February 12, 1952, Serial No. 271,109
Claims priority, application Great Britain January 2, 1952
5 Claims. (Cl. 95—4.5)

This invention relates to optical systems for photo-mechanical typographic-composing machines in which matter is composed by selectively projecting images of individual master characters or symbols on to a light-sensitive surface to form thereon lines of composition. The invention refers particularly to optical systems wherein the object and image planes are arranged and remain at a constant or fixed distance apart.

The chief object of the present invention is to provide in such an optical system mechanism by which individual characters or symbols can be projected for composition, precisely as to alignment, spacing and definition in any of a comprehensive range of sizes, say from 4¾ to 24 typographical points.

According to the present invention the mechanism which is mounted between the fixed planes for the object or master character and the image, or receiving elements, comprises two reflectors which are mounted on parallel guides on which they are relatively adjustable and are so arranged as to reflect an image of a master character from one to the other and thence to an image-receiving element, and a projection lens which is mounted on a guide parallel with the reflector guides and so that it can be adjusted along its optical axis and can also be positioned in the path of incidence of the first reflector or in the path of reflection between the second reflector and the image or receiving element.

The desired magnification or reductions of the projected images is produced by relative adjustment and positioning of the reflectors and the lens.

Figure 5:
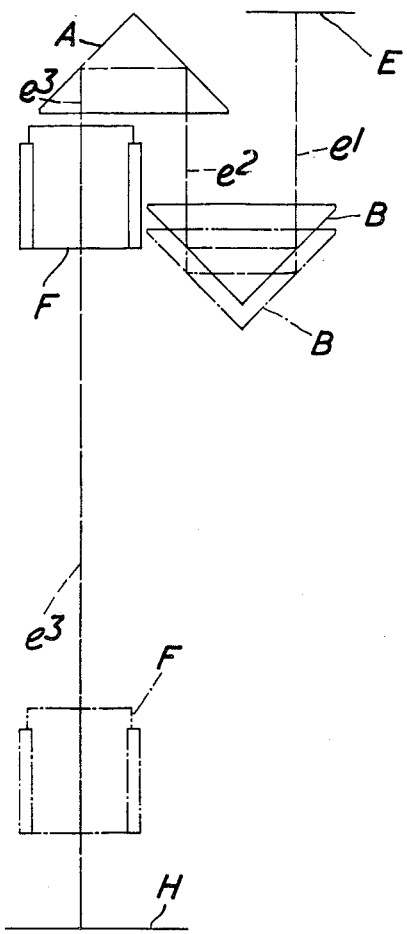
Figure 6:
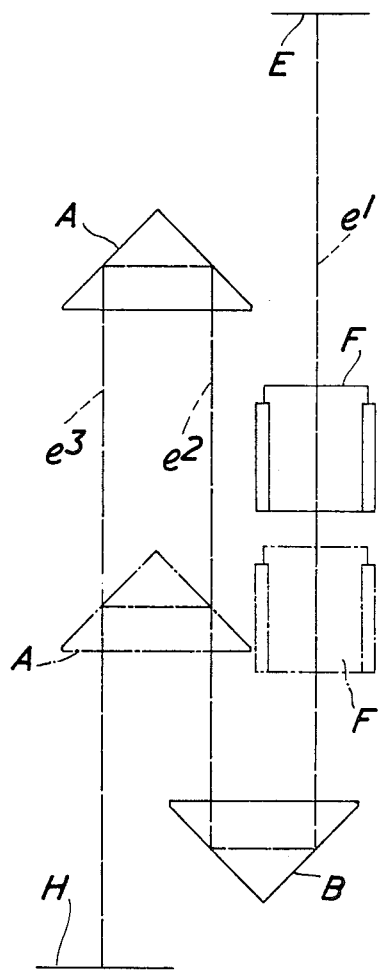

Referring to the accompanying drawings:

Fig. 1 is a sectional side-elevation of an optical system according to the invention, Fig. 2 is a sectional elevation at right angles to Fig. 1, Fig. 3 is a sectional view on the line III—III of Fig. 1, Fig. 4 is a plan view of the apparatus, and Figs. 5 and 6 are diagrams showing the optical geometry of the system with the lens in each of the alternate positions relative to the reflectors.

In the embodiment of the invention, illustrated and which will now be described, the object is represented by an assemblage of master characters or symbols and the image by a sensitized sheet, plate or film. In this embodiment also the reflectors are in the form of right-angled triangular prisms arranged in opposed overlapping relation and mounted in holders adjustable relative to each other along parallel guides. The lens is carried in a holder adjustable along a guide parallel to the prism guides and rotatable so that the lens can be swung from one position to the other.

These two right-angled triangular prisms A and B are held in position in holders A1 and B1 respectively by means of spring clips A2 and B2 respectively so that they may be readily detached from the holders when necessary. The holders A1 and B1 for the prisms A and B are carried on a pair of parallel guides A3 and B3 respectively, which are supported vertically on brackets A4 and B4 within a light excluding casing C, and these guides A3 and B3 are provided with racks A5 and B5 co-operating with toothed wheels A6 and B6 which are carried on spindles A7 and B7 rotatably mounted in the holders and fitted with thumb knobs A8 and B8 respectively by which the wheels A6 and B6 can be rotated to adjust the prisms along their guides A3 and B3.

The prisms are arranged in opposed overlapping relationship so that the image projected from a master character located in the plane E (see Figs. 1, 2, 5 and 6) enters the casing C through an aperture $C^0$ (see Figs. 1 and 2) is projected along a line $e^1$ on to the prisms B (see Figs. 1 and 6). The prism B projects the image along the line $e^2$ onto the prism A which in turn projects it along the line $e^3$ through the aperture C2 in the bottom of the casing C on to the image receiving element H. The accurate vertical adjustment of the prisms to give the correct focal distance is ensured by gauging distance pieces A9 and B9. These gauges are rested on the base C1 of the casing C and the prism holders are brought down to rest on their upper ends of their respective gauge piece. Interchangeable sets of gauge pieces are provided so that the appropriate set can be placed in position preparatory to setting the apparatus for composition of matter in a given point size.

A projection lens F is mounted in a holder F1 carried on a vertical pillar F2 and is adjustable thereon along the optical axis of the lens by means of a toothed wheel F3 carried on a spindle F4. The spindle F4 is rotatably mounted in the holder F1 and is provided with thumb knobs F5 at opposite ends thereof and the toothed wheel F3 meshes with a rack F6 on the pillar F2. The pillar is provided with trunnions F7 and F8 at the top and bottom respectively, which are rotatably mounted in bearings F9 and F10 respectively, so that the lens can be moved from the position shown in Fig. 3 in which it is arranged in the path of incidence $e^1$ of prism B, to a position shown in chain lines in Fig. 2 in which it is arranged in the path of reflection $e^3$ from the prism A. This rotation of the pillar is effected by means of an actuating sector F11 fixed to the top of the pillar F2 and having a locking plunger F12 which is moved inwardly to engage with either of the pair of sockets $f1$ and $f2$ by means of a screw member F13. The sockets $f1$ and $f2$ correspond to the left hand and right hand positions of adjustment of the lens as viewed in the drawings and serve to lock the lens in either of these positions. The sockets are formed in a sector-shaped member F14 which is fixed to the top of the casing C by screws F15 and carries the bearing member F9 which is formed integral therewith. A gauge piece F16 is provided similar to the gauge pieces A9 and B9 for determining the positioning of the lens according to the magnification or reduction necessary to produce composition in the required point size.

The apparatus above described is suitable for producing composed text in sizes ranging from 4¾ to 24 typographic point by the reduction or magnification from standard size characters on a master plate.

When prisms and lens are arranged as indicated at Fig. 5, the focal distance between the master character or object at E and the lens F is composed of paths $e1$ and $e2$ and the parts of the path $e3$ which is between the prism A and the lens F is longer than the remainder of the path $e3$ which extends from the lens F to the image or receiving element situated at H.

The position of the prism B for composition of 4¾ point is indicated in broken lines on Fig. 5 and for composition between 4¾ point and 12 point is moved upward until it reaches the position indicated in full lines in Fig. 5, which is the position for the production of composition in 12 point. For composition in each of these sizes, the lens F must be correspondingly adjusted.

The lens F is indicated in broken lines in the position it is placed for composition in 4¾ point size, and for sizes intermediate 4¾ and 12 point it is moved upwards until for 12 point size it reaches the position indicated in full lines in Fig. 5. The prism A is also raised to the position indicated in Fig. 5 and is kept in this position for all sizes from 4¾ to 12 point. The positions of the lens F and of the prisms A and B are accurately determined by the use of appropriate distance pieces A9, B9 and F16 as hereinbefore described.

Should the characters and symbols on the master plate be in, say 8 point then the projection of characters to produce composition in from 4¾ up to 7 point will be by reduction and not magnification.

For composing characters of from 14 point to 24 point size, the lens F is moved from the position shown in Fig. 5 to that shown in Figs. 1 and 6 in which it is in the light path e1 between the object E and the prism B. The prism B is set at the position indicated in Fig. 6 and is retained in that position for all sizes of composition between 14 and 24 point. The position of the lens F for the production of composition in 14 point is indicated in broken lines in Fig. 6 and for sizes above 14 point is raised until for 24 point it reaches the position indicated in full lines in Fig. 6. For this range of sizes the prism A must be correspondingly adjusted. This prism A is indicated in broken lines in Fig. 6 for the production of composition in 14 point for sizes above 14 point is raised for each progressive size until for 24 point it is in the position indicated in full lines in Fig. 6.

In all positions of adjustment for composition in from 14 to 24 point the image is projected from the object or master character along the path e1, through the lens F to the prism B, thence by the light path e2 from prism B to prism A and then from the prism A to the receiving element at H.

Access to the interior of the casing C for setting the apparatus is obtained through a door G in the front wall thereof. The door is provided with an abutment G1 arranged to engage one arm G2 of a crank pivoted to the casing at G5 and urged by a spring G3 to a position in which the other arm G4 of the crank acts as a shutter for the aperture C2. When the door is shut this shutter is clear of the aperture C2, but the initial effect of opening the door is to allow the shutter to close the aperture C2 and prevent light being transmitted to the sensitized element at H.

Instead of providing gauging pieces as already described, adjustable gauges or stops may be provided for locating the lens and prisms on their guides. Alternatively, the lens and prisms may be adjusted by means of screws passing through threaded bores in the holders, the latter having pointers co-operating with suitably calibrated scales on the outside light-excluding casing C.

Having described the invention I declare that what I claim is:

1. An optical system for a typographic photo-composing machine wherein the plane of the object or master characters and the plane of the image or sensitized receiving element remain fixed at a constant distance apart comprising two right-angled triangular prisms adjustable on separate pillars arranged parallel to each other and spaced apart so that the prisms overlap, and a lens adjustably supported on a pillar parallel to the pillars supporting the prisms, a light-excluding casing enclosing the prisms, the lens and their respective supporting pillars, a light-inlet opening in the casing coincident with the object or master character, a light-exit opening in the casing coincident with the image or sensitized element, a door on the casing, a shutter for the light-exit opening, and mechanism operated by the opening and closing movements of the door to operate the shutter.

2. An optical system for a typographic photo-composing machine wherein the plane of the object or master character and the plane of the image or sensitized receiving element, are fixed at a constant distance apart, comprising two right-angled triangular prisms, separate supporting pillars for the prisms arranged parallel to each other and so spaced apart that the prisms overlap, control mechanism for adjusting the prisms separately along their optical axis on their respective pillars, variable gauges for fixing the adjusted positions of each of the prisms to determine precisely each of their different positions of adjustment, a lens, a supporting pillar for the lens, means for moving the lens about its supporting pillar to move it either into or out of the optical path between the master character and one of said prisms or into or out of the optical path between the other of said prisms and the image, variable gauges for determining various positions of adjustment of the lens and mechanism for moving the lens around its supporting pillar.

3. An optical system for a typographic photo-composing machine wherein the plane of the master characters or object and the plane of the image or sensitized receiving element are fixed at a constant distance apart, comprising two reflectors, separate supporting columns for the reflectors arranged parallel to each other and so spaced apart that the reflectors overlap each other, means for moving each reflector along its supporting column, a lens, a supporting column for the lens arranged parallel to the columns for the reflectors, means for moving the lens along its optical axis on its supporting column, means for positioning the lens either in the optical path between the object or master character and one of the reflectors or in the optical path between the other reflector and the image or sensitized receiving element, and means associated with each reflector, and means associated with the lens, for determining respectively the adjusted position of each reflector and the lens in accordance with the desired magnification or reduction of the image.

4. An optical system for a typographic photo-composing machine wherein the planes of the object or master characters and the image or sensitized receiving element are fixed at a constant distance apart, comprising two right-angled triangular prisms, separate supporting pillars for the prisms, arranged parallel to each other and so spaced apart that the two prisms overlap each other, control means for adjusting each prism along its supporting pillar, a lens, a supporting pillar for the lens, control means for adjusting the lens along its optical axis on its supporting pillar, control means for moving the lens as required either into the optical path between the object or master character and one of the prisms or into the optical path between the second prism and the image or sensitized receiving element, and means associated with each reflector, and means associated with the lens, for determining respectively the positioning of each reflector and the lens in accordance with the desired magnification or reduction of the image.

5. An optical system for a typographic photo-composing machine wherein the plane of the object or master characters and the image or sensitized receiving element are fixed at a constant distance apart, comprising two right angle triangular prisms, separate supporting pillars for the prisms, arranged parallel to each other and so spaced apart that the two prisms overlap each other, control means for adjusting each prism along its supporting pillar, a lens, a supporting pillar for the lens, control means for adjusting the lens along its optical axis on its supporting pillar, means for rotating said lens supporting pillar to position said lens either in the optical path between the object or master character and one of the prisms or in the optical path between the second prism and the image or sensitized receiving element, means associated with each reflector, and means associated with the lens, for determining respectively the positioning of each reflector and the lens in accordance with the desired magnification or reduction of the image.

References Cited in the file of this patent

UNITED STATES PATENTS

| 1,116,069 | Jacob | Nov. 3, 1914 |

FOREIGN PATENTS

| 860,192 | France | Sept. 24, 1940 |